(12) United States Patent
Lerner

(10) Patent No.: US 9,697,005 B2
(45) Date of Patent: Jul. 4, 2017

(54) THREAD OFFSET COUNTER

(71) Applicant: ANALOG DEVICES, INC., Norwood, MA (US)

(72) Inventor: Boris Lerner, Sharon, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 642 days.

(21) Appl. No.: 14/096,580

(22) Filed: Dec. 4, 2013

(65) Prior Publication Data

US 2015/0154027 A1 Jun. 4, 2015

(51) Int. Cl.
*G06F 9/38* (2006.01)
*G06F 9/30* (2006.01)
*G06F 9/32* (2006.01)

(52) U.S. Cl.
CPC .......... *G06F 9/3867* (2013.01); *G06F 9/3001* (2013.01); *G06F 9/3004* (2013.01); *G06F 9/325* (2013.01); *G06F 9/3851* (2013.01)

(58) Field of Classification Search
CPC .................................. G06F 9/325; G06F 9/381
USPC ........................................................ 712/241
See application file for complete search history.

(56) References Cited

U.S. PATENT DOCUMENTS

| 6,282,631 | B1 | 8/2001 | Arbel |
| 6,624,818 | B1 | 9/2003 | Mantor et al. |
| 6,826,749 | B2 | 11/2004 | Patel et al. |
| 8,341,604 | B2 | 12/2012 | Codrescu et al. |
| 2002/0138718 | A1* | 9/2002 | Schlansker ........... G06F 9/3001 712/241 |
| 2003/0120905 | A1* | 6/2003 | Stotzer ..................... G06F 9/325 712/241 |
| 2003/0200421 | A1* | 10/2003 | Crook ..................... G06F 9/325 712/215 |
| 2004/0111594 | A1 | 6/2004 | Feiste et al. |
| 2005/0097140 | A1 | 5/2005 | Jarl |
| 2011/0154090 | A1 | 6/2011 | Dixon et al. |
| 2011/0283095 | A1* | 11/2011 | Hall ....................... G06F 9/3009 712/228 |

(Continued)

FOREIGN PATENT DOCUMENTS

| CN | 101322111 | 12/2008 |
| CN | 102566974 | 7/2012 |
| KR | 20090091170 | 8/2009 |

OTHER PUBLICATIONS

Extended European Search Report issued in European Patent Application Serial No. 14194100.5 mailed May 15, 2015, 7 pages.

(Continued)

*Primary Examiner* — Andrew Caldwell
*Assistant Examiner* — Michael Metzger
(74) *Attorney, Agent, or Firm* — Patent Capital Group

(57) ABSTRACT

In an example, there is disclosed a digital signal processor having a register containing a modular integer configured for use as a thread offset counter. In a multi-stage, pipelined loop, which may be implemented in microcode, the main body of the loop has only one repeating stage. On each stage, the operation executed by each thread of the single repeating stage is identified by the sum of a fixed integer and the thread offset counter. After each pass through the loop, the thread offset counter is incremented, thus maintaining pipelined operation of the single repeating stage.

20 Claims, 2 Drawing Sheets

(56) References Cited

U.S. PATENT DOCUMENTS

2012/0159120 A1* 6/2012 Foo .................. G06F 9/3009
                                                         712/22
2012/0254594 A1  10/2012 Hall et al.
2014/0152680 A1   6/2014 Chalil et al.

OTHER PUBLICATIONS

Clecio Donizete Lima et al., "Exploiting Loop-Level Parallelism with the Shift Architecture," Proceedings of the 14th Symposium on Computer Architecture and High Performance Computing (SBAC-PAD '02), 0-7695-1772-2/02 © 2002, IEEE, 8 pages.
Jordi Tubella et al., "Control Speculation in Multithread Processors through Dynamic Loop Detection," 0-8186-8323-6/98 © 1998, IEEE, 10 pages.
Preliminary Rejection issued in KR Patent Application Serial No. 2014-172064 mailed Apr. 29, 2016, 5 pages.
English Translation of Preliminary Rejection issued in KR Patent Application Serial No. 2014-172064 mailed Apr. 29, 2016, 4 pages.
Office Action (OA1) issued in CN Patent Application Serial No. 201410723083.7 mailed Nov. 30, 2016 including EN Summary of Relevance, 9 pages.
Notice of Allowance issued in KR Patent Application Serial No. 2014-172064 mailed Dec. 30, 2016, including EN Summary of Relevance, 3 pages.
EN Machine Translated Reference to 2 above (CN101322111), 7 pages.
EN Machine Translated Reference to 3 above (CN102566974), 6 pages.

* cited by examiner

THREAD OFFSET COUNTER

FIELD OF THE DISCLOSURE

This application relates to the field of computing, and more particularly to a thread offset counter for use in a pipelined processor.

BACKGROUND

Pipelining is a method of accelerating performance of a computing device by dividing tasks into a plurality of "stages," each of which may contain one or more "threads" that may not be mutually exclusive of other threads in the stage. For example, a pipeline stage may include a first thread that reads a value from memory for use in a later stage, a second stage that operates on a value read from memory in a previous stage, and a third stage that stores to memory a value that is the result of an operation performed in a previous stage. In some cases, speed and efficiency of pipelining may be better than in linear execution, wherein each instruction must sequentially load, execute, and then store.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
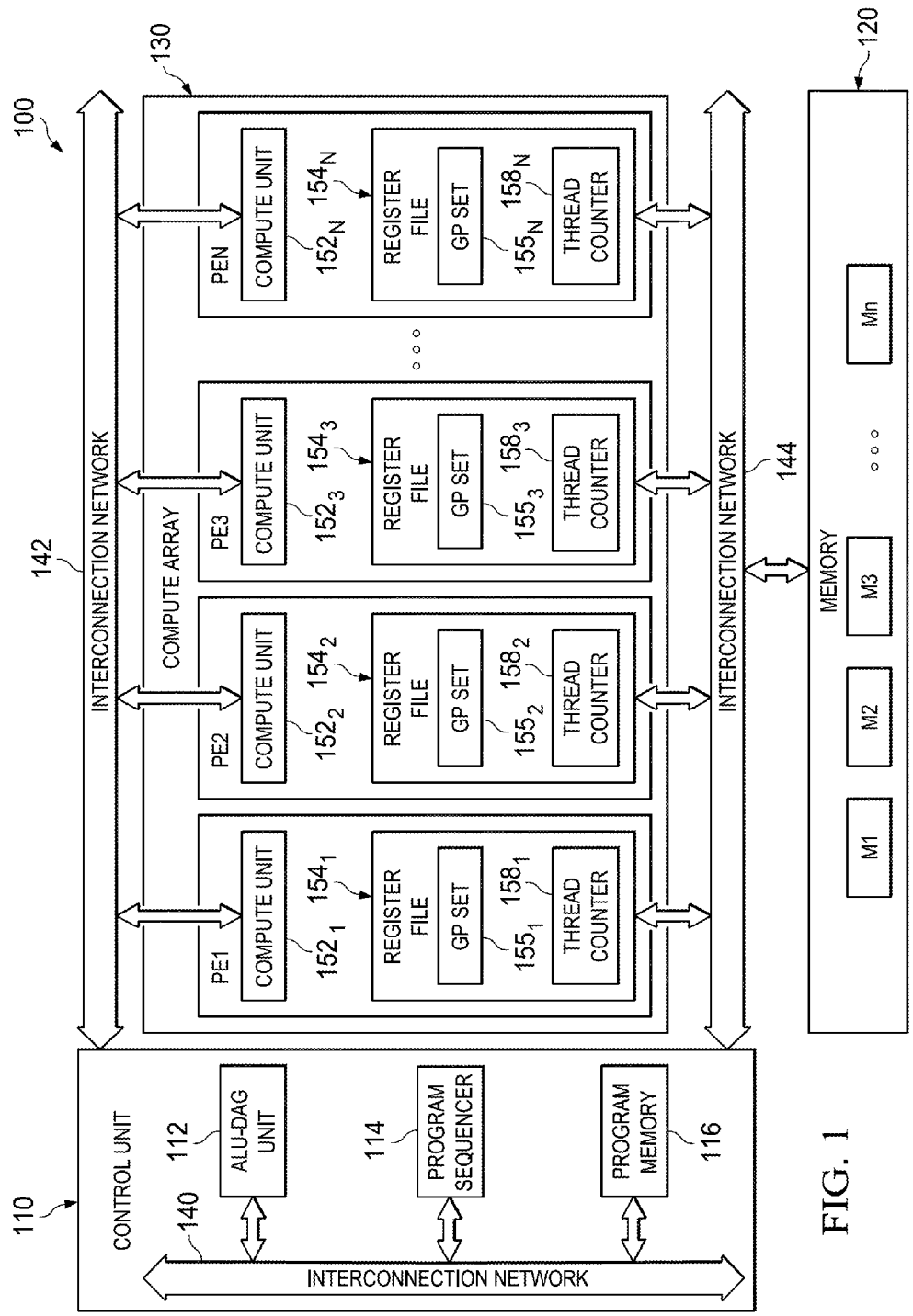
FIG. 1 is a block diagram of a pipelined multi-core digital signal processor according to one or more example embodiments of the present specification.

In one example, there is disclosed a digital signal processor comprising a first processing element configured to communicatively couple to a memory, the processing element comprising a compute unit; a general-purpose register set; and a thread count register configured to hold and operate on a modular integer.

In another example, there is disclosed A tangible computer-readable storage medium having stored thereon primitives for a loop with N iterations, the primitives operable to instruct the processor to initialize a loop counter to a value less than N; pre-fill a pipeline; execute a stage having a plurality of threads identified by a fixed integer plus a modular thread offset integer $O_\tau$ having a modulus M; increment $O_\tau$; if the loop counter is not zero, decrement the counter and perform the execute step again; if the counter is zero, flush the pipeline.

In yet another example, there is disclosed A method of performing a pipelined multi-stage loop of N iterations, using a thread offset counter $O_\tau$, comprising initializing a loop counter to a value less than N; pre-filling a pipeline; executing a stage having a plurality of threads identified by a fixed integer plus $O_\tau$; incrementing $O_\tau$; if the loop counter is not zero, decrementing the counter and performing the executing step again; if the counter is zero, flushing the pipeline.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments many have different advantages, and no particular advantage is necessarily required of any embodiment.

A "primitive" is expressly defined in this specification as a basic or primitive computing operation that may be used to build higher-level operations in conjunction with other primitives or higher-level operations, and may be, by way of non-limiting example, a user-accessible hardware instruction, a non-user-accessible operation performed as part of a hardware instruction, a user-accessible software procedure, or a non-user-accessible software procedure performed as part of a user-accessible software procedure, user-accessible microcode, or non-user-accessible microcode performed as part of a user-accessible microcode. An example primitive may have three parallel stages: (1) data load, (2) primitive execution, and (3) data store.

To optimize performance of a processor or hardware accelerator, multiple stages of an operation may be pipelined, wherein for example, a single stage may include three or more parallel primitives, such as (load, execute, store). In an example, three threads are defined. While a processor is executing a primitive, such as a multiply, on thread $\tau_N$, a direct memory access (DMA) engine may be writing out or storing the result of thread $\tau_{N-1}$, which results were computed in a previous stage, and reading in or loading data for thread $\tau_{N+1}$, for execution in the next stage. This means that the processing core can be optimized to continue operating on data without having to wait for data load and data store operations to complete.

An example processor may provide user-accessible primitives, such as microcode, that permit fine-grained control of processing. In this case, the user may define a loop with N iterations, with three threads, or in other words, M=3. The value of M=3, corresponding to three pipeline stages, is disclosed as an example, but it should be noted that the example is non-limiting, and M need not be the same as the number of pipeline stages, and either could be any positive integer, and more particularly a positive integer M>2.

The example microcode may be processed as follows, wherein "||" indicates parallel operation:

```
1 load K = (N-2)/3;          // Load loop count
2 load_data(thread=0);        // Bring new data into memory block 0
3 load_data(thread=1) || execute(thread=0);
                              // Bring new data into memory block 1,
                              // Process current data in memory block 0
4 load_data(thread=2) || execute(thread=1) || store_data(thread=0);
                              // Bring new data into memory block 2,
                              // Process current data in memory block 1,
                              // Store old data from memory block 0
5 load_data(thread=0) || execute(thread=2) || store data(thread=1);
                              // Bring new data into memory block 0,
                              // Process current data in memory block 2,
                              // Store old data from memory block 1
6 load_data(thread=1) || execute(thread=0) || store_data(thread=2);
                              // Bring new data into memory block 1,
                              // Process current data in memory block 0,
                              // Store old data from memory block 2
7 if K-- != 0, jump (4);
                              // If K is not zero, decrement and
                              // go to line 4.
8 execute(thread=1) || store_data(thread=0);
                              // Process current data in memory block 1,
                              // Store old data from memory block 0
9 store data(thread=1);       // Store old data from memory block 1
```

In line 1, the loop counter K is initialized to $(N-2)/3$. For example, assume a loop of 17 iterations. In that case, $K=5$, or in other words $K=(17-2)/3$. This value is used because the loop processes three threads on each iteration, while the remaining two primitives are handled in pre- and post-loop processing. More generally, K may be initialized to $K=(N-(M-1))/M$.

Lines 2-3 contain pre-processing operations for the loop, and may be referred to as a "prologue." In line 2, thread $\tau_0$ loads data from memory.

In line 3, thread $\tau_1$ loads data from memory, while in parallel thread $\tau_0$ executes a primitive using the data that were loaded in line 2.

Lines 4-6 contain the main body of the loop. In line 4, thread $\tau_2$ loads data from memory, thread $\tau_1$ executes its primitive, and thread $\tau_0$ stores its data to memory. For convenience, we define a shorthand for this by saying that line 4 performs a parallel (load, execute, store) with the form (2,1,0), meaning that thread $\tau_2$ is a "load" primitive, thread $\tau_1$ is an execute primitive, and thread $\tau_0$ is a store primitive. Similarly, line 5 performs a parallel (load, execute, store) with the form (0,2,1), and line 6 performs a parallel (load, execute, store) with the form (1,0,2).

In line 7, if count is not equal to zero, it is decremented and the loop returns to line 4 to process three more stages.

After the loop finishes, control passes to the "epilogue" of lines 8-9. In line 8, the primitive for thread $\tau_1$ is executed, and the processed data from thread $\tau_0$ are written out to memory.

In line 9, the last remaining data for thread $\tau_1$, from the primitive executed in line 8, are written out to memory. Thus, two load operations were performed in the prologue, fifteen were performed in the body of the loop, and none were performed in the epilogue, for a total of seventeen. One primitive was executed in the prologue, fifteen were executed in the body of the loop, and one was executed in the epilogue for a total of seventeen. No stores were executed in the prologue, fifteen were executed in the body of the loop, and two were executed in the epilogue, for a total of seventeen. Thus, seventeen total stages were carried out, with fifteen in the body of the loop. Note that because the main body of the loop executes a fixed block of three stages on each pass, the number of loop iterations must be modular with three, or in other words, $M||(N-(M-1))$ (M exactly divides $N-(M-1)$).

In some embodiments, including the one illustrated, the foregoing method requires three duplicate encodings of the loading, executing, and storing of data. This may be error-prone relative to writing that same encoding only once. Furthermore, the loop of the preceding example works correctly only when N has an exact modulus of 3. If instead of 15 iterations, 17 were needed, then the first two stages would have to be manually pre-processed before line 1 of the foregoing example code. This requires two additional copies of the load, execute, store process, which introduces further opportunities for errors and inefficiencies.

According to one or more example embodiments of the present specification, a novel thread offset counter is introduced to eliminate the redundancy of the foregoing operation and enable execution where N is an arbitrary value, including one that is not a modular integer. In this example, the thread offset counter, called $O\tau$, is a modular integer with a modulus of 3, but it should be noted that $O\tau$ may have any modulus greater than 2. Execution may proceed as follows:

```
1 load = N - 2 ;             // Load loop count
                             // No need to initialize 0τ.
2 load_data(thread=0 + 0τ);  // Bring new data into memory block 0 + 0τ.
3 load_data(thread=1 + 0τ) || execute(thread=0 + 0τ);
                             // Bring new data into memory block 1+ 0τ
                             // Execute thread 0 + 0τ.
4 load_data(thread=2 + 0τ) || execute(thread=1 + 0τ) ||
  store_data(thread=0 + 0τ);
                             // Bring new data into memory block 2 + 0τ,
                             // Process current data in memory block 1 +
                             0τ,
                             // Store old data from memory block 0 + 0τ.
5 0τ++;                      // Increment 0τ (mod 3)
6 if K-- != 0 jump (4);
                             // If count is not zero,
                             // Decrement and go to line 4.
7 execute(thread=1 + 0τ) || store_data(thread=0 + 0τ);
                             // Process current data in memory block
                             1 + 0τ,
                             // Store old data from memory block 0 + 0τ.
8 store_data(thread=1 + 0τ); // Store old data from memory block
                             1 + 0τ.
```

In line 1, the count is initialized to $K=N-2$, or more generally to $K=N-(M-1)$.

In line 2, data are loaded into thread $0+O_\tau$.

In line 3, data are loaded into thread $1+O_\tau$, in parallel with executing thread $0+O_\tau$, using data loaded from the previous stage as input.

Lines 4 and 5 contain the body of the loop. In line 4, the processor performs a parallel (load, execute, store) with the form $(2+O_\tau, 1+O_\tau, 0+O_\tau)$. In line 5, the thread offset counter is incremented. Again, it should be noted that in this example, $O_\tau$ is a modular integer, specifically with a modulus of 3. Thus, where $O_\tau=2$, $O_\tau++=0$.

In line 6, if counter K is not zero, it is decremented, and control returns to line 4. If counter K has reached zero, control passes to line 7, where thread $1+O_\tau$ is executed, and data in thread $0+O_\tau$ are written out to memory in parallel.

In line 8, data from thread $1+O_\tau$ are written out to memory, completing the processing.

As used throughout this specification, a "processor" or "digital signal processor" is expressly defined as any programmable logic device, implemented in hardware, software, firmware, or any combination thereof, configured to operate on executable primitives, including by way of non-limiting example, a microprocessor, central processing unit, field-programmable gate array, application-specific integrated circuit, or virtual machine processor. "Data" are expressly defined as any type of numeric, voice, video, media, or script data, or any type of source or object code, or any other suitable information in any appropriate format that may be communicated from one point to another. "Load" is expressly defined as reading data from a first location for use in a second location. "Store" is expressly defined as writing data from a first location to a second location. "Memory" is expressly defined as any combination of volatile or non-volatile computer storage, whether tangible or intangible, including by way of non-limiting example main memory, cache, level-1 memory, level-2 memory, solid-state memory, optical data storage, and magnetic data storage.

Turning now to the attached figures, FIG. 1 is a schematic block diagram of an example digital signal processor (DSP) 100 according to one or more example embodiments of the present specification. FIG. 1 has been simplified for the sake of clarity and to better understand the novel concepts of the present disclosure. Additional features may be added in DSP 100, and some of the features described below may be replaced or eliminated in other embodiments of DSP 100. Furthermore, DSP 100 is provided herein only as one example of a processor to aid in discussion.

DSP 100 may include a control unit 110, a memory 120, and a compute array 130. In an example, control unit 110 and compute array 130 constitute a core processor that can perform computation and data processing functions of DSP 100. Some embodiments of DSP 100 include other components, such as a microcontroller for executing microcontroller primitives, a direct memory access (DMA) unit, and various interfaces to off-chip devices.

Control unit 110 facilitates program execution of DSP 100. Control unit 110 may include an arithmetic logic unit and data address generation (ALU-DAG) unit 112, a program sequencer 114, and a program memory 116. Control unit 110 may also include other components, such as an instruction cache, a timer, and an instruction register. ALU-DAG unit 112 supports general purpose integer computations and supplies addresses for memory addresses. For example, ALU-DAG 112 provides memory addresses when data are transferred between memory 120 and registers (such as register files of compute array 130, described below). ALU-DAG unit 112 can supply addresses to data memory (for example, memory 120) and/or program memory 116. Program sequencer 114 provides primitive addresses to program memory 116 for primitive fetches. Program memory 116 stores programs that DSP 100 implements to process data (such as that stored in memory 120) and can also store process data. Programs include primitive sets having one or more primitives, and DSP 100 implements the programs by fetching the primitives, decoding the primitives, and executing the primitives. In an example, programs may include primitive sets for implementing various DSP algorithms, including algorithms relying on a thread counter 158.

Memory 120 stores information/data to be processed by DSP 100 (data memory), programs implemented by DSP 100 to process the information/data (program memory), or a combination thereof. In the depicted embodiment, memory 120 has a multi-banked interleaved memory structure, such that the memory 120 includes memory banks M1, M2, M3, ... Mn, where n is a total number of memory banks of memory 120. In an example, memory 120 is a random access memory, such as a static random-access memory (SRAM), dynamic RAM (DRAM), flash or other suitable memory technology. In an example, one or more memory banks M are a separate RAM. Alternatively, in various implementations, memory 120 is another suitable type of memory.

An interconnection network 140, an interconnection network 142, and an interconnection network 144 interconnect control unit 110, memory 120, and compute array 130, thereby providing communication pathways between control unit 110, memory 120, and compute array 130. Interconnection network 140, interconnection network 142, and interconnection network 144 may include a single bus, multiple buses, a crossbar network, a single-stage network, a multistage network, other type of interconnection network, or combination thereof. Control unit 110 issues primitives and data addresses to compute array 130 via interconnection network 142. Interconnection network 142 thus transfers addresses for primitives and data to various processing elements PE of compute array 130 via interconnection network 142. Interconnection network 144 transfers data and/or primitives from memory (such as memory 120, program memory 116, other memory, or combination thereof), such that contents of any register in DSP 100 can be transferred to any other register or to any memory location and memory 120 can provide data operands (values) to compute array 130.

In some embodiments, compute array 130 includes a plurality of processing elements PE1, PE2, PE3, ... PEX, where X is a total number of processing elements of compute array 130. In an example, compute array 110 may include four processing elements (PE1, PE2, PE3, and PE4). Processing elements PE perform numeric processing, for example for DSP algorithms. Processing elements PE may operate independently, in parallel, or as a SIMD engine. In the present example, each processing element PE may be a vector processor. Alternatively, processing elements PE may be a combination of scalar processors and vector processors.

Processing elements PE each include a respective computation unit (CU) 152. In the depicted embodiment, computation units 152 may be identical, although the present disclosure contemplates embodiments where computation units 152 are not identical. The present disclosure further contemplates configurations where one or more processing elements PE do not include a computation unit 152. In the present example, computation units 152 each include an arithmetic logic unit (ALU), a multiplier-accumulator (MAC), a shifter, other computational unit, or combinations thereof. An ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. An example MAC can perform multiplication operations as well as multiply and accumulate operations, such as single-cycle multiply, multiply/add, multiply/subtract, other operations, or combinations thereof. A shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. In various embodiments, the ALU, MAC, and/or shifter include registers associated therewith.

Processing elements PE may also each include a respective register file 154. In the depicted embodiment, register files 154 may be identical, although the present disclosure contemplates embodiments where register files 154 are not identical. The present disclosure further contemplates configurations where one or more processing elements PE do not include a register file 154. Register files 154 include registers that transfer data between processing elements PE and data interconnection networks (such as interconnection network 144) and stores results. In the present example, register files 154 can include a respective general purpose register set 155 that include general purpose registers having widths dependent on design requirements of DSP 100, such as 32-bit general purposes registers, 40-bit general purpose registers, 64-bit general purpose registers, 128-bit general purposes registers, other width general purpose registers, or a combination thereof. For purposes of the following discussion, general purpose registers 155 includes thirty-two 32-bit general purpose registers, which may be designated as registers R0-R31 by way of example. In the present example, register files 154 each include a respective thread counter 158, which may be configured to hold a thread offset, called $O_\tau$ in this example. Register files 154 can include additional registers according to design requirements of DSP 100. Further, in various implementations, thread counters 158 may be general purpose registers 154 from general purpose register sets 155. In one example embodiment, each PE includes at least one dedicated modular thread counter 158 that is 32-bits wide. In other embodiments, each PE may include a plurality of thread counters 158.

In the present example, thread counter 158 is modular, meaning that it has a definite "modulus." In modular mathematics, incrementing the integer past the modulus or decrementing it below zero causes the integer to "wrap around." For example, if modular integer I has a modulus of 8, then where I=7, I+1=0, I+2=1, and so on. Likewise, where I=0, I−1=7, I−2=6, and so on. In one sense, integer registers naturally have a species of modularity, in that a 16-bit register has a natural modulus of 65,536, and thus will roll over from 65,535 to 0. In this example, thread counter 158 is different in that its modularity is defined not solely by its data width, but by another value such as a number of pipeline stages. Thus, in this specification a "modular integer" is expressly defined as an integer having a modulus M other than a modulus defined by the data width of the register or other memory element in which the modular integer is stored, wherein a maximum value of the modular integer is M−1. Modularity may be implemented in hardware, software, firmware, or any combination of the foregoing, and in certain embodiments, the modulus M of a modular integer may be programmable or otherwise user-configurable, while in other embodiments the modulus may be fixed in hardware.

In a more general sense, a processor may include a circular buffer, defined by an interval [B,B+L−1], where B is the base of the buffer and L is the length of the buffer. In some cases, values for B and L may be provided in user-defined registers. When a pointer performing circular access on such a buffer increments past B+L−1, L is subtracted from it. When it decrements below B, L is added to it. In the special case where B=0, the buffer is a modular integer. Using the foregoing example, integer I is a circular buffer with base B=0 and length L=8. Where I=7, I+1>(L−1=7).∴I+1≡(I+1)−L=7+1−8=0. Likewise, I+2>(L−1=7).∴I+2≡(I+2)−L=7+2−8=1. And where I=0, I−1<(B=0).∴I−1≡(I−1)+L=0−1+8=7. Likewise, I−2<(B=0).∴I−2≡(I−2)+L=0−2+8=6.

DSP 100 can perform various parallel operations. For example, during a single cycle, processing elements PE may access a primitive (via interconnection network 142) and access N data operands from memory (via interconnection network 144) for synchronous processing. In SIMD mode, DSP 100 may process multiple data streams in parallel. For example, when in SIMD mode, DSP 100 in a single cycle may dispatch a single primitive to each or a plurality of processing elements PE via interconnection network 142; load N data sets from memory (memory 120, program memory 116, other memory, or combination thereof) via interconnection network 144, one data set for each processing element PE (in an example, each data set may include two data operands); execute the single primitive synchronously in processing elements PE; and store data results from the synchronous execution in memory 120.

In certain embodiments, DSP 100 can also perform SIMD within a register (SWAR), where registers (for example, general purpose registers) of any processing element PE are divisible into more than one processing lane, such that any processing element PE can individually perform parallel operations on their respective processing lanes. For example, in SWAR mode, any processing element PE can perform parallel operations on n lanes, each being k/n bits wide, where k is a width in bits of a register. It is contemplated that SIMD or SWARE primitives may form a part of a stage according to one or more example embodiments of the present specification.

Figure 2:
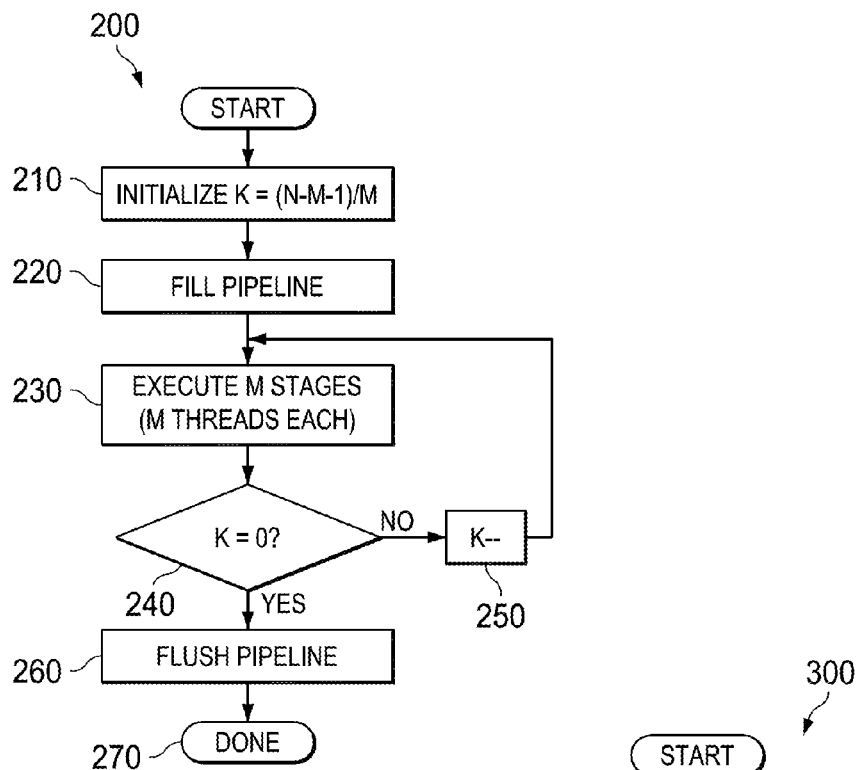
FIG. 2 is a flow diagram of a method of performing pipelined computing without a thread offset counter according to one or more example embodiments of the present specification.

FIG. 2 is a flow diagram of a method 200 of performing pipelined computing without a thread offset counter according to one or more example embodiments of the present specification. Starting in block 210, the counter K, which may be stored in a general-purpose register 155, such as register R0, is initialized to K=(N−2)/3, or more generally to K=(N−(M−1))/M, where N is the total number of iterations of the loop to be performed, and M is the number of pipeline stages or threads. Note that for this example to work correctly, N should evenly divisible by M with no remainder.

In block 220, the pipeline is "pre-filled." In the example disclosed, this requires two stages. The first stage contains only one thread: load a memory block into thread $\tau_0$, for example, processing element PE1 may load data from memory M1 into register R1. The second stage contains two parallel threads: load a memory block into thread $\tau_1$, for example processing element PE1 may load data from memory M2 into register R2, while compute unit 152 executes one or more primitives in thread $\tau_0$ (using the data already in register R1 as input) in parallel. Two stages are disclosed by way of example, but it should be noted that in other examples, where M≠3, the method may be adapted appropriately. The purpose of pre-filling the pipeline in an example is to ensure that the body of the loop will operate on a full pipeline on each iteration. Thus, in a five stage pipeline, four stages may be needed pre-fill the pipeline, with one, two, three, and four parallel threads respectively. More generally, M−1 stages may be required to pre-fill the pipeline, and the number of parallel threads in each stage may increase from 1 to M−1. This ensures that when the loop is entered, the pipeline is full on the first pass through the loop, and remains full throughout each subsequent pass.

Block 230 is the main body of the loop. In this example, the loop separately executes M stages, each having M parallel threads. For example, where M=3, processing element PE1 may perform a parallel (load, execute, store) stage with the form (2,1,0), wherein data are loaded from memory block M3 into register R3 in thread $\tau_2$, compute unit 152 executes a primitive, using data in register R2 as input in thread $\tau_1$, and the result of a previous primitive, stored in register R1, is written out to memory block M1 in thread $\tau_0$. Processing element PE1 then performs a parallel (load, execute, store) with the form (0,2,1), wherein data are loaded from memory block M1 into register R1 in thread $\tau_0$, compute unit 152 executes a primitive, using data in register R3 as input in thread $\tau_2$, and the result of a previous primitive, stored in register R2, is written out to memory block M2 in thread $\tau_1$. Finally, processing element PE1 performs a parallel (load, execute, store) with the form (1,0,2), wherein data are loaded from memory block M2 into register R2 in thread $\tau_1$, compute unit 152 executes a primitive, using data in register R1 as input in thread $\tau_0$, and the result of a previous primitive, stored in register R3, is written out to memory block M3 in thread $\tau_2$. Note that while this example discloses an example wherein each thread accesses a different memory bank, such a configuration is not necessary or desirable in all cases. In other examples, each thread may access the same memory bank. For example, the threads may be operating on a single array, in which case rather than accessing different memory banks, each thread will access a different offset in the same memory bank.

In block 240, if counter K has not reached zero, then in block 250, counter K is decremented and control returns to block 230 for another iteration of the loop.

If counter K has reached zero, then control passes to block 260, where the pipeline is flushed. This is essentially the reverse of the pipeline pre-fill of block 210 and may ensure that stages begun in the body of the loop are completed. Like the pre-fill, this may have a total of M−1 stages, and each may include a number of parallel threads starting at M−1 and going down to 1 for the last stage. In the example shown here, in the first stage, compute unit 152 of processing element PE1 executes a primitive using data in register R2 in thread $\tau_1$. In parallel, data are written out from register R1 to memory block M1 in thread $\tau_0$. In the second stage, on thread $\tau_1$, data in register R2 are written out to memory block M2. In block 270, the method is complete.

Figure 3:
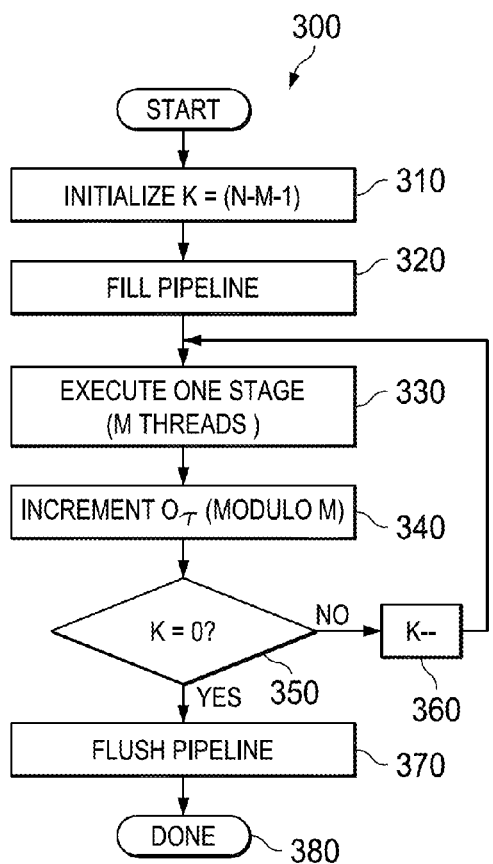
FIG. 3 is a flow diagram of a method of performing pipelined computing with a thread offset counter according to one or more example embodiments of the present specification.

FIG. 3 is a flow diagram of a method 300 of performing pipelined computing with a thread offset counter according to one or more example embodiments of the present specification. In block 310, counter K is initialized to K=N−(M−1). In the example shown above M=3, so K is initialized to N−2. For convenience of reference, K may be stored in register R31 in this example, though this selection is non-limiting.

In block 320, the pipeline is pre-filled. In an example, the pipeline pre-fill of block 320 may be substantially identical to the pipeline pre-fill of block 220 of FIG. 2.

Blocks 330 and 340 comprise the main body of the loop. In block 330, a single stage with M parallel threads is executed. Thread counter $O_\tau$ receives the value of thread counter 158, which may be a separate register. The stage is a parallel (load, execute, store) with the form (2+$O_\tau$, 1+$O_\tau$, 0+$O_\tau$). Thus, in thread 2+$O_\tau$, data are loaded from memory block M(2+$O_\tau$) into register R(2+$O_\tau$).

It should be noted that the math of the foregoing operations is modular in the disclosed embodiment, with a modulus of 3. For example, if $O_\tau$=2, (2+$O_\tau$=1) because the value "rolls over" from 2 to 0.

In thread 0+$O_\tau$, data in register R(0+$O_\tau$) are written out to memory block M(0+$O_\tau$). It should also be noted that although registers, memory, and threads are all disclosed in this example as being dynamically allocated, in some examples, only one of the foregoing could be dynamically allocated. For example, thread $\tau_1$ may be configured to always use a specific register or to always access a specific memory block.

In block 340, thread offset counter $O_\tau$ is incremented. Again, it is noted that $O_\tau$ is a modular integer in the present example, with a modulus of 3.

In block 350, if counter K≠0, in block 360 K is decremented and control passes back to block 330 for the next iteration of the loop. On the other hand, if K=0, the main body of the loop has finished.

In block 370, the pipeline is "flushed." In an example, the pipeline flushing may be substantially the same as disclosed in connection with block 260 of FIG. 2. In block 380, the method is complete.

Advantageously, the code generated according to the method of FIG. 3 may be simpler and occupy less memory than code generated according to the method of FIG. 2. The method of FIG. 3 may also work for an arbitrary value of N>2, regardless of whether N is a modular integer of M, whereas the method of FIG. 2 requires the loop to be executed on a value of N that is a modular integer of M. Thus, the method of FIG. 2 may require up to M−1 stages to be pre-processed to yield an integer N that is a modular integer of M if it is not naturally so. It should also be noted that the final results of FIG. 3 do not depend on the initial value of $O_\tau$, so that there is no need to initialize $O_\tau$ on each pass through the loop.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of primitives associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer primitives executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A digital signal processor for providing a pipeline thread capability comprising:
   a first processing element configured to communicatively couple to a memory, the processing element further configured to execute a loop with N iterations, comprising:
      an execution unit including circuitry to compute a thread offset counter $O_\tau$, wherein $O_\tau$ is a modular integer having a modulus M and configured to represent a pipeline offset for a threaded pipeline operation, wherein the execution unit is configured to execute a stage having a plurality of threads indexed by a fixed integer plus $O_\tau$; and
      a thread offset count register configured to hold thread offset counter $O_\tau$.

2. The digital signal processor of claim 1, wherein the modulus M is three.

3. The digital signal processor of claim 1, wherein the modulus M is user-configurable.

4. The digital signal processor of claim 1 further comprising a plurality of processing elements substantially identical to the first processing element.

5. The digital signal processor of claim 1 communicatively coupled to a storage medium having stored thereon primitives for executing a loop with N iterations, the primitives operable to instruct the processor to:
   initialize a loop counter to a value less than N;
   pre-fill a pipeline;
   execute a stage having a plurality of threads indexed by a fixed integer plus $O_\tau$;
   increment the thread counter;
   if the loop counter is not zero, decrement the loop counter and perform the execute again; and
   if the loop counter is zero, flush the pipeline.

6. One or more tangible, non-transitory computer-readable storage mediums having stored thereon primitives for a loop with N iterations, the primitives operable to instruct a digital signal processor to:
   initialize a loop counter to a value less than N;
   pre-fill a pipeline;
   execute a stage having a plurality of threads indexed by a fixed integer plus a modular thread offset integer $O_\tau$ having a modulus M, wherein $O_\tau$ is a modular integer to represent a pipeline offset for a threaded pipeline operation;
   increment $O_\tau$;
   if the loop counter is not zero, decrement the loop counter and perform the execute step again;
   if the loop counter is zero, flush the pipeline.

7. The tangible, non-transitory computer-readable storage mediums of claim 6, wherein M=3.

8. The tangible, non-transitory computer-readable storage mediums of claim 7, wherein:
   pre-filling the pipeline comprises executing a first stage with a single thread comprising loading a first value, and executing a second stage with a first thread comprising executing a primitive using the first value as an input in parallel with a second thread comprising loading a second value.

9. The tangible, non-transitory computer-readable storage mediums of claim 7, wherein the plurality of threads identified by the fixed integer plus a modular thread offset integer comprise:
   a parallel (load, execute, store) with the form ($2+O_\tau$, $1+O_\tau$, $0+O_\tau$).

10. The tangible, non-transitory computer-readable storage mediums of claim 6, wherein initializing the loop counter comprises initializing the loop counter to the value of M−1.

11. The tangible, non-transitory computer-readable storage mediums of claim 10, wherein pre-filling the pipeline comprises executing N−(M−1) stages, wherein a first stage has one thread and each other stage has one thread more than its preceding stage.

12. The tangible, non-transitory computer-readable storage mediums of claim 10, wherein flushing the pipeline comprises executing N−(M−1) stages, wherein a first stage has N−(M−1) threads and each other stage has one thread less than its preceding stage.

13. A method of performing a pipelined multi-stage loop of N iterations, using a thread offset counter $O_\tau$, wherein $O_\tau$ is to represent a pipeline offset for a threaded pipeline operation, comprising:
   initializing a loop counter to a value less than N;
   pre-filling a pipeline;
   executing a stage having a plurality of threads indexed by a fixed integer plus $O_\tau$;
   incrementing $O_\tau$;
   if the loop counter is not zero, decrementing the loop counter and performing the executing again;
   if the loop counter is zero, flushing the pipeline.

14. The method of claim 13, wherein the thread offset counter $O_\tau$ is a modular integer having a modulus M.

15. The method of claim 14, wherein M=3.

16. The method of claim 15, wherein:
   pre-filling the pipeline comprises executing a first stage with a single thread comprising loading a first value, and executing a second stage with a first thread comprising executing a primitive using the first value as an input in parallel with a second thread comprising loading a second value.

17. The method of claim 15, wherein the plurality of threads identified by the fixed integer plus $O_\tau$ comprise:
   a parallel (load, execute, store) with the form ($2+O_\tau$, $1+O_\tau$, $0+O_\tau$).

18. The method of claim 14, wherein initializing the loop counter comprises initializing the loop counter to the value of M−1.

19. The method of claim 18, wherein pre-filling the pipeline comprises executing N−(M−1) stages, wherein a first stage has one thread and each other stage has one thread more than its preceding stage.

20. The method of claim 18, wherein flushing the pipeline comprises executing N−(M−1) stages, wherein a first stage has N−(M−1) threads and each other stage has one thread less than its preceding stage.

* * * * *